United States Patent
Schellenberg et al.

(12)

(10) Patent No.: US 6,384,159 B1
(45) Date of Patent: May 7, 2002

(54) PRODUCTION OF POLYETHYLENE WITH A TITANIUM AMIDE CATALYST

(75) Inventors: Jürgen Schellenberg; Heinz-Jürgen Kerrinnes, both of Halle; Gerd Fritzsche, Merseburg; Gerd Lohse, Schkopau, all of (DE)

(73) Assignee: Buna Sow Leuna Olefinverbund GmbH, Schkopau (DE)

( * ) Notice: Subject to any disclaimer, the term of this patent is extended or adjusted under 35 U.S.C. 154(b) by 0 days.

(21) Appl. No.: 09/463,853

(22) PCT Filed: Jul. 10, 1998

(86) PCT No.: PCT/DE98/01939

§ 371 Date: Apr. 21, 2000

§ 102(e) Date: Apr. 21, 2000

(87) PCT Pub. No.: WO99/06447

PCT Pub. Date: Feb. 11, 1999

(30) Foreign Application Priority Data

Jul. 31, 1997 (DE) .......................... 197 32 963

(51) Int. Cl.$^7$ .............................. C08F 4/02; C08F 4/642
(52) U.S. Cl. ................. 526/119; 526/124.3; 526/124.9; 526/125.7; 526/161; 526/201; 526/904; 526/906; 526/907; 526/908; 502/105; 502/109; 502/114; 502/115; 502/118; 502/122; 502/125; 502/126; 502/128
(58) Field of Search ................ 502/109, 114, 502/115, 118, 122, 125, 126, 105, 128; 526/124.3, 124.9, 161, 201, 904, 906, 907, 908, 125.7, 119

(56) References Cited

FOREIGN PATENT DOCUMENTS

| DE | 282013 A | 8/1990 |
|---|---|---|
| DE | 282013 A5 * | 8/1990 |
| EP | 0320169 | 6/1989 |
| EP | 320169 * | 6/1989 |

OTHER PUBLICATIONS

A. Batistini, Macromol. Symp. 100, 1995, 137–142.

A. Imai, H. Shiraishi, H. Jouhouji, Studies in Surface Science and Catalysis 92, 1995, 299–302.

* cited by examiner

*Primary Examiner*—David W. Wu
*Assistant Examiner*—R. Rabago
(74) *Attorney, Agent, or Firm*—Horst M. Kasper

(57) ABSTRACT

The present invention relates to a process to produce polyethylene through homopolymerization or copolymerization of ethylene with alpha-olefins in the presence of a titanium amide catalyst supported by an organic polymer material, for the production of moldings, such as through extrusion, injection molding, film blowing, sintering under pressure or ram extrusion. The catalyst according to the present invention contains a partially chloromethylated styrene divinyl benzene copolymer as the organic polymer material, a complex compound supported by it, which contains Mg, Al and Ti.

15 Claims, No Drawings

PRODUCTION OF POLYETHYLENE WITH A TITANIUM AMIDE CATALYST

The present invention relates to a process to make polyethylene through homopolymerization or copolymerization of ethylene with alpha-olefins in the presence of a titanium amide catalyst on an organic polymer carrier for the production of moldings through extrusion, injection molding, film blowing-extrusion, sintering under pressure or ram extrusion. Further, the invention relates to a titanium amide catalyst on an organic polymer carrier, and its manufacture.

It is known that organometallic catalysts for the polymerization of ethylene based on titanium amides, which were contacted with aluminorganic or magnesium-organic compounds prior to their addition to the polymerization system, yield polyethylenes with long-chain branchings in the polymer molecules (A. Imai, H. Shiraishi, H. Jouhouji: Studies in Surface Science and Catalysis 92 (1995) 299 ff.). Such long-chain branched polyethylenes are characterized by a number of new and interesting properties. These include, among others, an improved processability at common shearing speeds as compared to conventional polymers, at similar densities and similar melt flow index (MFI) due to a dynamic viscosity of the polymers decreasing with an increasing degree of long-chain branching (A. Batistini: Macromol. Symp. 100 (1995) 137 ff.). To make efficient practical use of such specific catalysts for producing polyethylene, it is often necessary to fix the catalyst components on a suited carrier. This can be done through various processes using special inorganic carriers (EP 320 169). Carrier-based catalyst systems, however, are disadvantageous inasfar as they have to undergo a high-temperature treatment for conditioning or as they may cause corrosion on the polymer processing machines due to residual chlorine remaining in the polymers produced, or as they may cause undesired processing phenomena, such as specks or pinholes, due to inorganic carrier remaining in the polymer.

It is the intention of the invention to develop a process for making polyethylene through homopolymerization or copolymerization of ethylene with alpha-olefins in the presence of a titanium amide catalyst on an organic polymer carrier, and a titanium amide catalyst on an organic polymer carrier, which do not show the known disadvantages and which are characterized by a high polymerization activity, a low catalyst residual content, and a good polymer color as well as efficient production.

According to the invention, polymerization to produce polyethylene through homopolymerization or copolymerization of ethylene with alpha-olefins is initiated by 1. a titanium amide catalyst on an organic polymer carrier with
   a) a partly chloromethylated styrene divinyl benzene copolymer with
      a divinyl benzene content of 1 to 45 percent by weight,
      a chlorine content of 5 to 23 percent by weight,
      a specific surface area of 5 to 1,000 m²/g, and
      a particle size of 50 to 3,000 μm as the organic polymer material
   b) a complex compound supported by the above organic polymer material, with the general formula of $(R_mMgX_{2-m})\cdot(R_nAlY_{3-n})_p\cdot(X_qTiL_{4-q})\cdot ED_r$ whereby:
   R=alkyl, cycloalkyl, aryl, aralkyl, alkaryl, alkenyl
   X=halogen
   Y=hydrogen, halogen, alkoxy
   L=dialkylamido, dicycloalkylamido, diarylamido, diaralkylamido, dialkarylamido or mixed
   ED=organic compound acting as electron donor, such as linear or cyclic ethers, thioethers or others
   m=1 or 2
   n=numerical value 1 through 3
   p=numerical value 0.1 to 1
   q=0, 1, 2 or 3
   r=numerical value 1 to 2
   c) the conversion product of the complex compound supported by the organic polymer material of b) with a mixture of
   A) a compound of the general formula of $X_mTiY_{4-m}$ whereby
   Y=halogen, alkyl, aryl, alkaryl, aralkyl, alkoxy, aroxy
   m=1, 2, 3 or 4 and
   B) a compound of the general formula of $R_nCX_{4-n}$ whereby
   R=hydrogen, alkyl, aryl, alkaryl, aralkyl, chloromethyl, dichloromethyl, trichloromethyl or partially halogenated alkyl
   X=halogen, alkyl, alkenyl, aryl, alkaryl, aralkyl, alkoxy, aroxy
   n=0, 1, 2 or 3
   with a molar ratio of the compounds A) and B) in the range of 1:0.1 to 1:2 whereby the starting substrate for the compound supported by the organic polymer material at b) is made through intensive grinding and mingling of the organic polymer material with the transition metal compound below the glass transition temperature of the polymer under anaerobic conditions, and 2. a compound of the following general formula acting as an activator $R_mAlY_{3-m}$ whereby
   R=alkyl, cycloalkyl, aryl, alkaryl, aralkyl, alkenyl
   Y=hydrogen, halogen, alkoxy
   m=numerical value of 1 to 3.

According to the invention, a partly chloromethylated styrene divinyl benzene copolymer with
a divinyl benzene content of 2 to 25 percent by weight,
a chlorine content of 15 to 22.5 percent by weight,
a specific surface of 10 to 300 m²/g, and
a particle size of 80 to 2,000 μm
can be used as the organic polymer material.

According to the invention, triisobutyl aluminum can be used as the compound acting as activator. In accordance with the present invention, tetrakis-(diethyl amido) titanium can be used as the transition metal compound for the starting substrate made through intensive grinding and mingling with the organic polymer material for the compound supported by the organic polymer material. According to the invention, the polymer made through homopolymerization or co-polymerization of ethylene with alpha-olefins in the presence a titanium amide catalyst supported by an organic polymer carrier can have viscosity numbers from 150 to 3,000 ml/g. In accordance with the present invention, the titanium amide catalyst supported by an organic polymer material contains a) a partly chloromethylated styrene divinyl benzene copolymer as the organic polymer material, with:
a divinyl benzene content of 1 to 45 percent by weight,
a chlorine content of 5 to 23 percent by weight,
a specific surface of 5 to 1,000 m²/g, and
a particle size of 50 to 3,000 μm, b) a complex compound supported by the organic polymer material of the following general formula $$(R_mMgX_{2-m}) \cdot (R_nAlY_{3-n})_p \cdot (X_qTiL_{4-q}) \cdot ED_r$$

whereby:
R=alkyl, cycloalkyl, aryl, aralkyl, alkaryl, alkenyl
X=halogen
Y=hydrogen, halogen, alkoxy
L=dialkylamido, dicycloalkylamido, diarylamido, diaralkylamido, dialkarylamido or mixed
ED=organic compound acting as electron donor, such as linear or cyclic ethers, thioethers or others
m=1 or 2
n=numerical value of 1 to 3
p=numerical value of 0.1 to 1
q=0, 1, 2 or 3
r=numerical value of 1 to 2 c) the conversion product of the complex compound at b) supported by the organic polymer material, with a mixture of A) a compound of the general formula of $$X_mTiY_{4-m}$$

whereby
X, Y=halogen, alkyl, aryl, alkaryl, aralkyl, alkoxy, aroxy
m=1, 2, 3 or 4, and B) a compound of the general formula of $$R_nCX_{4-n}$$

whereby
R=hydrogen, alkyl, aryl, alkaryl, aralkyl, chloromethyl, dichloromethyl, trichloromethyl or partially halogenated alkyl
X=halogen, alkyl, alkenyl, aryl, alkaryl, aralkyl, alkoxy, aroxy
n=0, 1, 2 or 3
with a molar ratio of compounds A) to B) in the range of 1:0.1 to 1:2, whereby:
the starting substrate for the compound at b) supported by the organic polymer material is made through intensive grinding and mingling of the organic polymer material with the transition metal compound below the polymer's transition temperature under anaerobic conditions, and
the titanium amide catalyst supported by the organic polymer material is activated by a compound of the following general formula $$R_mAlY_{3-m}$$

whereby:
R=alkyl, cycloalkyl, aryl, alkaryl, aralkyl, alkenyl
Y=hydrogen, halogen, alkoxy
m=numerical value of 1 to 3.

According to the present invention, this catalyst can be made from the components of claim 6, through conversion in the order mentioned therein.

Below, the invention will be explained for some selected embodiments.

EMBODIMENT NO. 1
Production of Supported Titanium Amide Catalyst 0.394 g of magnesium chips were dispersed under anaerobic conditions in a mixture of 32.1 ml of dried hexane and 1.77 ml of dried tetrahydrofuran, and made to boil and react by adding 2.22 ml of distilled n-butyl chloride drop by drop over ca. 13 mins., and by adding a trace of iodine at the back-flow, if necessary, with stirring. After another 9.25 hours of boiling at the back-flow, the magnesium chips were completely dissolved, and the formation of the magnesium-organic compound was completed. Now, 17.5 ml of triisobutyl aluminum in the form of a 5% solution in hexane were added drop by drop to the boiling suspension over 35 mins., and heated for another hour with stirring at the back-flow. 3.13 g of a mixture of 25 percent by weight of tetrakis-(diethylamido) titanium and 75 percent by weight of a partially chloromethylated styrene divinyl benzene copolymer with
a divinylbenzene content of 5.5 percent by weight
a chlorine content of 21.6 percent by weight
a specific surface of 55 m²/g, and
a particle size of 300 to 1,200 μm
made through intensive anaerobic grinding and mingling by means of a planetary micro mill in a syalon beaker were added to this suspension at room temperature. Then, a mixture of 0.44 ml of 1,2-dichloroethane, 12 ml of hexane and 0.25 ml of titanium tetrachloride were added drop by drop with cooling and left in the boiling heat for 1 hour. The resulting brown suspension of the titanium amide catalyst contained approx. 0.98 mg of titanium per ml of suspension.

EMBODIMENT NO. 2
Polymerization with the Supported Titanium Amide Catalyst

Hexane containing triisobutyl aluminum as an activator was given into a secured stirrer/autoclave flushed with ethylene as per Table 1. The respective amount of the suspension of titanium amide catalyst made as per Embodiment no. 1 as a hexane dilution was added, and ethylene applied at 2 bar. After rapid heating to the polymerization temperature of 85° C. with intensive stirring, the ethylene pressure was finally adjusted to the value specified in Table 1, and kept constant for the two hours of polymerization by continuously adding more monomer to compensate the latter's consumption. After that, the monomer supply was discontinued to stop the test, the reactor content was cooled and depressurized, and the polyethylene was filtered off and dried.

The results of this polymerization and the properties of the polyethylene produced are shown in Table 2. The test demonstrates the feasibility to produce a polymer with extraordinary morphological properties, such as a high bulk density, at very high viscosity numbers and thus molecular weights using the catalyst made in accordance with the invention. In addition, the product has a very good inherent color as is obvious from the high value of the color value $C_y$, and its production yield is very high. The catalyst can be produced and used to simple procedures, without any high-temperature treatment and without multiple separation of inert reaction media, in the form of a suspension or its dilution.

EMBODIMENT NO. 3

Polymerization with the Supported Titanium Amide Catalyst

The same procedure as outlined for embodiment no. 2 was used for the polymerization of the supported titanium catalyst made according to embodiment no. 1. The quantities of catalyst suspension, activator and solvent, and the adjusted partial pressure of the ethylene are shown in Table 1.

The results of this polymerization and the properties of the polyethylene are shown in Table 2. It is obvious that the titanium catalyst made according to the present invention is characterized by a high polymerization activity. This catalyst can be produced and used to straightforward processes and does not require high-temperature treatment or multiple separation of inert reaction media, without expensive cocatalysts, such as methylalumoxanes. The polymer as such has a high molecular weight, a high bulk density and a very good inherent color. In addition, the polymer has a low ash and residual catalyst content and a sufficiently high temperature of the oxidation maximum.

EMBODIMENT NO. 4

Polymerization with the Supported Titanium Amide Catalyst

In this embodiment, polymerization was conducted using the catalyst made as described for embodiment no. 1 and to the specifications of embodiment no.2 as given in Table 1. The properties of this polyethylene and the results of polymerization are shown in Table 2 for comparison with those of embodiments 2 and 3. This polymer, too, is characterized by very good morphological properties, such as bulk density and particle size, a very high viscosity number and thus molecular weight, and a good color value, which confirms the excellent optical properties of the polymers made according to the present invention.

EMBODIMENT NO. 5

Polymerization with the Supported Titanium Amide Catalyst

The polymerization was conducted according to embodiment no. 2 and Table 1. However, this time in the presence of hydrogen the partial pressure of which was adjusted after applying the first partial volume of ethylene at room temperature. Table 2 summarizes the results of polymerization and the properties of the polyethylene. The lower viscosity number of the polymer achieved through the use of hydrogen demonstrates the high flexibility of the titanium amide catalyst in adjusting the product properties, and more specifically the flow behavior and molecular weight parameters.

TABLE 1

Polymerization conditions

| Embodiments | 2 | 3 | 4 | 5 |
|---|---|---|---|---|
| Catalyst suspension portion of titanium used [mg] | 0.148 | 0.148 | 0.148 | 0.148 |
| [mg/l] | 0.211 | 0.211 | 0.211 | 0.211 |
| Activator quantity (triisobutyl aluminium) [mmole] | 1.4 | 1.4 | 1.4 | 1.4 |
| [mmole/l] | 2.0 | 2.0 | 2.0 | 2.0 |
| Molar ratio Al:Ti | 452:1 | 452:1 | 452:1 | 452:1 |
| Total hexane [ml] | 700 | 700 | 700 | 700 |
| Total pressure [bar] | 6.0 | 7.0 | 5.0 | 7.0 |
| Ethylene partial pressure [bar] | 4.7 | 5.7 | 3.7 | 4.7 |
| Hydrogen partial pressure [bar] | — | — | — | 1.0 |

TABLE 2

Results of polymerization and properties of the polyethylene made with the titanium amide catalyst

| Properties | Unit | Embodiment no. 2 | Embodiment no. 3 | Embodiment no. 4 | Embodiment no. 5 |
|---|---|---|---|---|---|
| Results of polymerization | | | | | |
| Polymer yield | G | 198.5 | 249.8 | 148.8 | 69.7 |
| Catalyst yield | KgPE/gTi | 1,337 | 1,682 | 1,002 | 469 |
| Catalyst yield | KgPE/mmole Ti | 64.0 | 80.6 | 48.0 | 22.5 |
| Polyethylene properties | | | | | |
| Bulk density (to DIN 53468) | g/l | 310 | 317 | 309 | 295 |
| Density (to ISO 1183) | g/cm$^3$ | 0.938 | 0.939 | 0.939 | — |
| Viscosity number (to ISO 1191) | Cm$^3$/g | 1,710 | 1,465 | 1,690 | 270 |
| Color value Cv (Hunter-Lab) | | 114.0 | 116.9 | 113.6 | — |
| Melt flow index (MFI) (190° C., 10 kg) (to ISO 1133) | g/10 mins. | — | — | — | 1.77 |
| Molecular weight (SEC) | | | | | |
| $M_w$ | g/mole | — | — | — | 205,000 |
| $M_n$ | g/mole | — | — | — | 38,200 |
| Particle-size distribution | | | | | |
| Average particle size | μm | 423 | — | 417 | 438 |
| Particle-size range | μm | ~30–1,000 | — | ~30–1,000 | ~30–1,200 |
| Residual Catalyst content in polymer | | | | | |
| Ti | ppm wt | 2.2 | 1.5 | 1.1 | — |
| Al | ppm wt | 120 | 110 | 130 | — |
| Ash | ppm wt | 300 | 245 | 290 | 620 |
| Temperature of melt maximum (DTA) | ° C. | 142.6 | 142.6 | 142.2 | 129.5 |

What is claimed is:

1. A process to produce polyethylenes through homopolymerization or copolymerization of ethylene with alpha-olefins in the presence of a titanium amide catalyst supported by an organic polymer carrier, characterized by polymerization that is initiated through
   i) a titanium amide catalyst on an organic polymer carrier with
      a) a partly chloromethylated styrene divinyl benzene copolymer with
         a divinyl benzene content of 1 to 45 percent by weight,
         a chlorine content of 5 to 23 percent by weight,
         a specific surface area of 5 to 1,000 m$^2$/g, and
         a particle size of 50 to 3,000 μm as the organic polymer material
      b) a complex compound supported by the above organic polymer material, with the general formula of

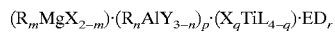

wherein:
R=alkyl, cycloalkyl, aryl, aralkyl, alkaryl, alkenyl
X=halogen
Y=hydrogen, halogen, alkoxy
L=dialkylamido, dicycloalkylamido, diarylamido, diaralkylamido, dialkarylamido or mixed
ED=organic compound acting as electron donor
m=1 or 2
n=numerical value of 1 through 3
p=numerical value of 0.1 to 1
q=0, 1, 2 or 3
r=numerical value of 1 to 2 c) the conversion product of the complex compound supported by the organic polymer material of b) with a mixture of
A) a compound of the general formula of $$X_mTiY_{4-m}$$

wherein
X, Y=halogen, alkyl, aryl, X alkaryl, aralkyl, alkoxy, aroxy
m=1, 2, 3 or 4 and
B) a compound of the general formula of $$R_nCX_{4-n}$$

wherein
R=hydrogen, alkyl, aryl, alkaryl, aralkyl, chloromethyl, dichloromethyl, trichloromethyl or partially halogenated alkyl
X=halogen, alkyl, alkenyl, aryl, alkaryl, aralkyl, alkoxy, aroxy n=0, 1, 2 or 3 with a molar ratio of the compounds A) and B) in the range of 1:0.1 to 1:2 wherein
the starting substrate for the compound supported by the organic polymer material at b) is made through intensive grinding and mingling of the organic polymer material with the transition metal compound below the glass transition temperature of the polymer under anaerobic conditions, and
ii) a compound of the following general formula acting as an activator $$R_mAlY_{3-m}$$

wherein
R=alkyl, cycloalkyl, aryl, alkaryl, aralkyl, alkenyl
Y=hydrogen, halogen, alkoxy
m=numerical value of 1 to 3.

2. The process according to claim 1 wherein a partially chloromethylated styrene divinyl benzene copolymer with
a divinyl benzene content of 2 to 25 percent by weight
a chlorine content of 15 to 22.5 percent by weight
a specific surface of 10 to 300 m²/g, and
a particle size of 80 to 2,000 μm
is used as the organic polymer material.

3. The process according to claim 1 wherein the compound acting as an activator is triisobutyl aluminum.

4. The process according to claim 1 wherein the tetrakis (diethylamido)titanum is used as the transition metal compound for the starting substrate for the organic polymer material resulting from intensive grinding and mingling with the organic polymer material.

5. The process according to claim 1 wherein the polymer made through homopolymerization or copolymerization of ethylene with alpha-olefins in the presence of a titanium amide catalyst supported by an organic polymer material has viscosity numbers of 150 to 3,000 ml/g.

6. A titanium amide catalyst supported by an organic polymer material, with
a) a partially chloromethylated styrene divinyl benzene copolymer as the organic polymer material, with
a divinyl benzene content of 1 to 45 percent by weight,
a chlorine content of 5 to 23 percent by weight,
a specific surface of 5 to 1000 m²/g, and
a particle size of 50 to 3,000 μm
b) a complex compound supported by this organic polymer material, of the general formula of:

$$(R_mMgX_{2-m})·(R_nAlY_{3-n})_p·(X_qTiL_{4-q})·ED_r$$

whereby
R=alkyl, cycloalkyl, aryl, aralkyl, alkaryl, alkenyl
X=halogen
Y=hydrogen, halogen, alkoxy
L=dialkylamido, dicycloalkylamido, diarylamido, diaralkylamido, dialkarylamido or mixed
ED=organic compounds acting as electron donors
m=1 or 2
n=numerical value of 1 to 3
p=numerical value of 0.1 to 1
q=0, 1, 2 or 3
r=numerical value of 1 to 2 c) the conversion product of the complex compound supported by the organic polymer material of b) with a mixture of
A) a compound of the general formula of $$X_mTiY_{4-m}$$

wherein
X, Y=halogen, alkyl, aryl, alkaryl, aralkyl, alkoxy, aroxy
m=1, 2, 3 or 4 and
B) a compound of the general formula of $$R_nCX_{4-n}$$

wherein
R=hydrogen, alkyl, aryl, alkaryl, aralkyl, chloromethyl, dichloromethyl, trichloromethyl or partially halogenated alkyl
X=halogen, alkyl, alkenyl, aryl, alkaryl, aralkyl, alkoxy, aroxy
n=0, 1, 2 or 3
with a molar ratio of the compounds A) and B) in the range of 1: 0.1 to 1:2 wherein:
the starting substrate for the compound supported by the organic polymer material at b) is made through intensive grinding and mingling of the organic polymer material with the transition metal compound below the glass transition temperature of the polymer under anaerobic conditions, and
the titanium amide catalyst supported by an organic polymer material is activated by a compound of the general formula of $$R_mAlY_{3-m}$$

wherein
R=alkyl, cycloalkyl, aryl, alkaryl, aralkyl, alkenyl

Y=hydrogen, halogen, alkoxy m=numerical value of 1 to 3.

7. The catalyst according to claim 6, wherein this catalyst is made through conversion of the components mentioned at claim 6 in the order specified.

8. A method for production of polyethylenes through polymerization of ethylene with alpha-olefins in the presence of a titanium amide catalyst supported by an organic polymer carrier, comprising preparing an organic polymer material comprising a partly chloromethylated styrene divinyl benzene copolymer with
a divinyl benzene content of 1 to 45 percent by weight,
a chlorine content of 5 to 23 percent by weight,
a specific surface area of 5 to 1,000 m²/g, and
a particle size of 50 to 3,000 μm;

supporting a complex compound having the general formula of:

wherein:
R=alkyl, cycloalkyl, aryl, aralkyl, alkaryl, alkenyl
X=halogen
Y=hydrogen, halogen, alkoxy
L=dialkylamido, dicycloalkylamido, diarylamido, diaralkylamido, dialkarylamido or mixed
ED=organic compound acting as electron donor
m=1 or 2
n=numerical value of 1 through 3
p=numerical value of 0.1 to 1
r=numerical value of 1 to 2 on said organic polymer material by intensive grinding and mingling of the organic polymer material with the complex compound below a glass transition temperature of the polymer under anaerobic conditions and whereby a starting substrate is obtained;

preparing a mixture of

A) a compound of the general formula of

wherein
X, Y=halogen, alkyl, aryl, alkaryl, aralkyl, alkoxy, aroxy
m=1, 2, 3 or 4 and B) a compound of the general formula of

wherein
R=hydrogen, alkyl, aryl, alkaryl, aralkyl, chloromethyl, dichloromethyl, trichloromethyl or partially halogenated alkyl
X=halogen, alkyl, alkenyl, aryl, alkaryl, aralkyl, alkoxy, aroxy
n=0, 1, 2 or 3 with a molar ratio of the compounds A) and B) in the range of 1:0.1 to 1:2 converting the complex compound supported by the organic polymer material by contacting the complex compound supported by the organic polymer material with said mixture and thereby obtaining a titanium amide catalyst on an organic polymer carrier material;

adding a compound of the following general formula acting as an activator

wherein
R=alkyl, cycloalkyl, aryl, alkaryl, aralkyl, alkenyl
Y=hydrogen, halogen, alkoxy
m=numerical value of 1 to 3 to the titanium amide catalyst for obtaining an activated titanium amide catalyst;

polymerizing ethylene with alpha-olefins in the presence of the activated titanium amide catalyst.

9. The method according to claim 8 wherein the organic polymer material is a partially chloromethylated styrene divinyl benzene copolymer with
a divinyl benzene content of 2 to 25 percent by weight
a chlorine content of 15 to 22.5 percent by weight
a specific surface of 10 to 300 m²/g, and
a particle size of 80 to 2,000 μm.

10. The method according to claim 8 wherein the compound acting as an activator is triisobutyl aluminum.

11. The method according to claim 8 wherein the transition metal compound is tetrakis(diethylamido)titanium employed in preparing the starting substrate for the organic polymer material resulting from intensive grinding and mingling with the organic polymer material.

12. The method according to claim 8 wherein the polymer is made through homopolymerization of ethylene with alpha-olefins in the presence of the titanium amide catalyst supported by an organic polymer material having a viscosity numbers of 150 to 3,000 ml/g.

13. The method according to claim 8 wherein the polymer made through copolymerization of ethylene with alpha-olefins in the presence of the titanium amide catalyst supported by an organic polymer material having a viscosity numbers of 150 to 3,000 ml/g.

14. An activated titanium amide catalyst supported by an organic polymer material comprising an organic polymer material furnished by a partially chloromethylated styrene divinyl benzene copolymer having
a divinyl benzene content of 1 to 45 percent by weight,
a chlorine content of 5 to 23 percent by weight,
a specific surface of 5 to 1000 m²/g, and
a particle size of 50 to 3,000 μm a converted complex compound supported by this organic polymer material, wherein the complex compound has the general formula of:

wherein
R=alkyl, cycloalkyl, aryl, aralkyl, alkaryl, alkenyl
X=halogen
Y=hydrogen, halogen, alkoxy
L=dialkylamido, dicycloalkylamido, diarylamido, diaralkylamido, dialkarylamido or mixed
ED=organic compounds acting as electron donors
m=1 or 2
n=numerical value of 1 to 3
p=numerical value of 0.1 to 1
q=0, 1, 2 or 3
r=numerical value of 1 to 2 wherein the organic polymer material and the transition metal compound are subjected to intensive grinding and mingling below a glass transition temperature of the organic polymer material under anaerobic conditions, and wherein the conversion product of the complex compound supported by the organic polymer material is obtained by contacting a mixture of A) a compound of the general formula of $$X_mTiY_{4-m}$$

wherein
X, Y=halogen, alkyl, aryl, alkaryl, aralkyl, alkoxy, aroxy
m=1, 2, 3 or 4 and B) a compound of the general formula of $$R_nCX_{4-n}$$

wherein
R=hydrogen, alkyl, aryl, alkaryl, aralkyl, chloromethyl, dichloromethyl, trichloromethyl or partially halogenated alkyl
X=halogen, alkyl, alkenyl, aryl, alkaryl, aralkyl, alkoxy, aroxy
n=0, 1, 2 or 3
with a molar ratio of the compounds A) and B) in the range of 1:0.1 to 1:2 with the transition metal compound supported by the organic polymer material for obtaining a titanium amide catalyst supported by an organic polymer material; and an activator furnished by a compound of the general formula of $$R_mAlY_{3-m}$$

wherein
R=alkyl, cycloalkyl, aryl, alkaryl, aralkyl, alkenyl
Y=hydrogen, halogen, alkoxy
m=numerical value of 1 to 3.

15. The catalyst according to claim 14 wherein this catalyst is made through conversion of the components in the sequential order as recited.

* * * * *